Patented Oct. 17, 1939

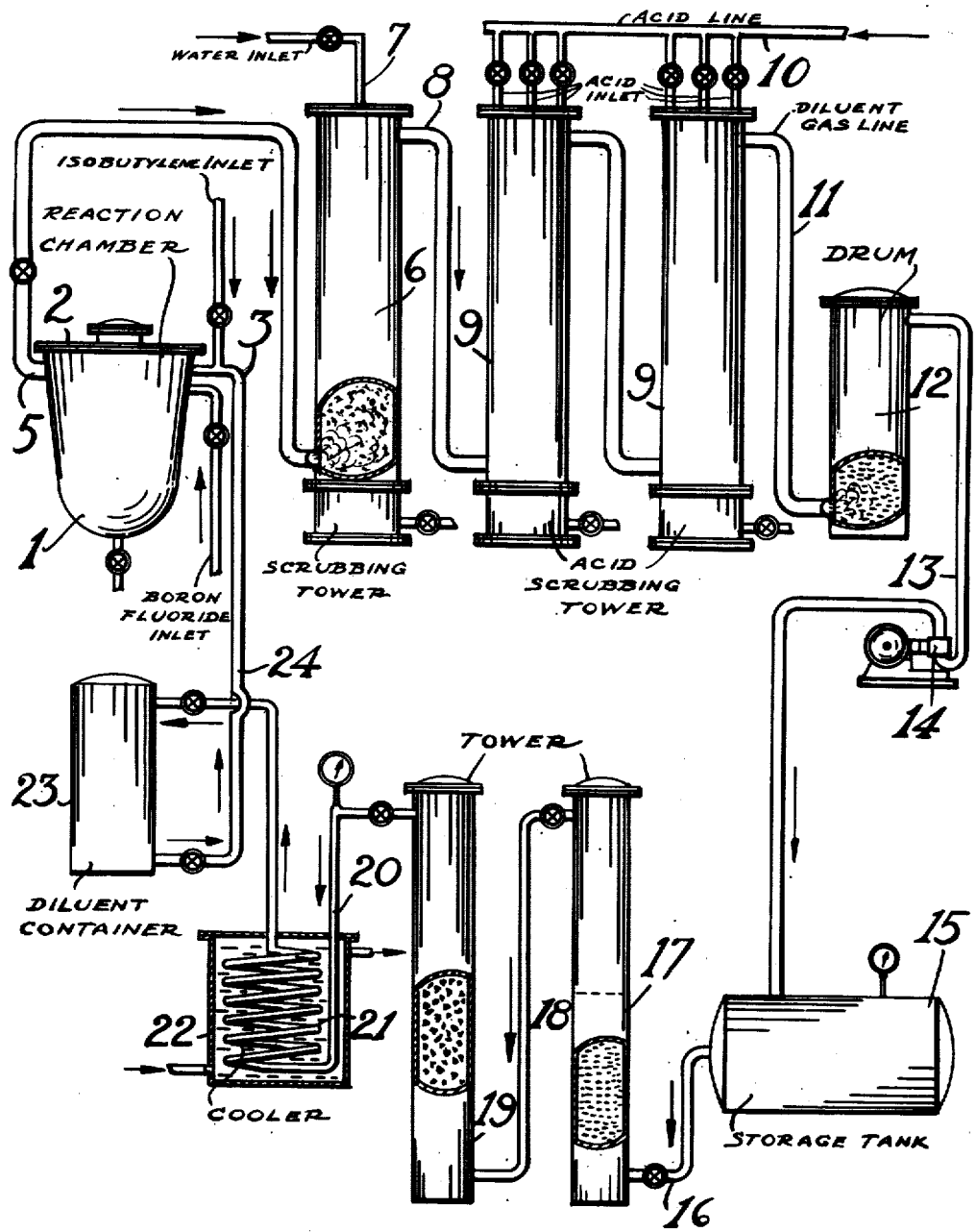

2,176,194

UNITED STATES PATENT OFFICE 2,176,194

PROCESS FOR MAKING ISOBUTYLENE POLYMERS OF HIGH MOLECULAR WEIGHT

Lewis A. Bannon, Roselle, N. J., assignor to Standard Oil Development Company, a corporation of Delaware Application November 21, 1936, Serial No. 111,984

10 Claims. (Cl. 260—94)

The present invention relates to the production of extremely heavy polymers from isobutylene.

When pure isobutylene is subjected to the action of boron fluoride at a sub-zero temperature, it polymerizes very rapidly to hydrocarbons of high molecular weight, ranging upwardly from 5000 and varying in physical nature from a viscous oil to a tough rubber-like solid. In its highly polymerized state, the polymer has a molecular weight in the neighborhood of 200,000.

In carrying out this process, isobutylene in the liquid state is fed with a liquid refrigerant, such as ethylene, ethane, propylene, propane, etc., into a reaction zone into which boron fluoride is introduced. The heat of reaction vaporizes the refrigerant which passes off overhead together with some of the boron fluoride. The refrigerant is then conducted to a water scrubbing tower, the purpose of which is to hydrolyze any boron fluoride present, next through acid scrubbing towers in which the gas is scrubbed with concentrated sulfuric acid for the purpose of removing unconverted isobutylene, and then through a drum of flake caustic for removing any entrained acidity and is then compressed. Upon compression, it is again treated to make certain that residual acidity and moisture are removed, and it is then cooled to the liquid state, after which it is mixed with isobutylene and introduced into the reaction chamber.

In the operation of this process, it has frequently been found that, for some inexplicable reason, a polymer of satisfactory molecular weight could not be obtained consistently, although operating conditions were carefully controlled and the recycle gas was carefully purified in the manner described above. In some instances, the polymer would reach only a certain molecular weight very much below that desired and the reaction would then cease or, if the reaction proceeded, the product would be sticky.

It has now been found that the reason for the aforesaid difficulty is that the diluent gas, which in the present case is also the refrigerant, in leaving the reaction chamber carries with it some isobutylene which is in part polymerized by the action of the boron fluoride carried off from the reaction before the diluent gas reaches the sulfuric acid. It is also possible that in the treatment with sulfuric acid to remove isobutylene some of the latter is converted into dimer and trimer which are not soluble in the acid. In any case, small traces of polymers are carried through the system by the diluent gas and back into the reaction chamber. These low molecular weight polymers act as poisons to the polymerization of isobutylene to high molecular weight polymers and prevent the polymerization from progressing to the desired extent.

In order to overcome this difficulty, it is proposed, according to the present invention, to subject the diluent gas to a treatment for the removal of these low molecular weight polymers such as to the action of an absorbent material, just prior to its re-introduction into the reaction chamber. For this purpose, the diluent gas, after the other various purifying treatments and, at any rate, after the treatment with concentrated sulfuric acid, is contacted with active carbon, highly absorbent clay or any other suitable absorbent packed in a tower. The inclusion of this step in the process results in the production of a more uniform product of higher average molecular weight than is attainable when this step is omitted.

A front elevation of an apparatus suitable for carrying out the process of the present invention is illustrated in diagrammatic form in the attached drawing, in which 1 is a reaction chamber, which is usually heavily heat insulated, and provided with a removable cover 2, the operation to be described being a batch operation. Chamber 1 is provided with inlet 3 for the diluent, (which in the present case also acts as the refrigerant and is ethylene and isobutylene), inlet 4 for boron fluoride, and with an exhaust pipe 5 for the elimination of vaporized diluent and boron fluoride.

The diluent containing boron fluoride and some isobutylene is conducted by pipe 5 to a scrubbing tower 6 which is packed with contact material, such as glass or porcelain balls, Raschig rings, or the like, in the usual manner, or provided with internal equipment, such as discs and doughnuts. This tower has a water inlet 7 at its top and an outlet 8 for the scrubbed gases. In this tower, the boron fluoride is hydrolyzed and boric hydroxide collects at the bottom of the tower and may be withdrawn from time to time in any suitable manner.

The diluent, still containing isobutylene, is then conducted by line 8 to one or more acid scrubbing towers 9, which are similar to the water scrubbing tower with the exception of course that they are provided at the top with inlets for acid which is carried in line 10. In these towers the isobutylene is absorbed.

The diluent gas is then conducted by line 11 from the acid scrubbing towers to a drum 12 filled with flake caustic which serves to eliminate any entrained acid in the diluent. The thus purified diluent is then passed through line 13 and compressor 14 to a storage tank 15 from which it is withdrawn when needed through line 16 and passed, if necessary, through another tower 17 which is packed partially with flake caustic and partially with calcium chloride. This second treatment with flake caustic can ordinarily be dispensed with, and is only included as an extraordinary safeguard against the possibility of any acid being carried by the diluent back to the reaction chamber. Ordinarily, flake caustic in this zone functions more as a dehydrating agent than as a neutralizing agent.

The diluent is then passed through line 18 to the bottom of tower 19 which is packed with a solid absorbent in accordance with the present invention. Leaving tower 19 at its top through line 20, the diluent passes through cooling coil 21 which is surrounded by a chamber 22 which may be filled with any suitable refrigerating medium. With ethylene as the diluent, a suitable refrigerating medium is a mixture of solid $CO_2$ and alcohol. The liquefied diluent is stored in container 23 from which it may be withdrawn as desired through line 24.

In a series of consecutive runs, isobutylene was mixed with liquefied ethylene and polymerized by the action of boron fluoride, the reaction temperature being between about −98 and −103° F. In the first ten runs, the tower 19 was omitted. Nine more runs were made with the tower 19 included. The results were as follows:

| Consecutive runs before use of charcoal | | Consecutive runs with use of charcoal | |
| --- | --- | --- | --- |
| Run No. | M. W. | Run No. | M. W. |
| 12 | 135,000 | 22 | 150,000 |
| 13 | 42,000 | 23 | 160,000 |
| 14 | 108,000 | 24 | 186,000 |
| 15 | 58,000 | 25 | 168,000 |
| 16 | 138,000 | 26 | 150,000 |
| 17 | 132,000 | 27 | 188,000 |
| 18 | 126,000 | 28 | 146,000 |
| 19 | 136,000 | 29 | 153,000 |
| 20 | 135,000 | 30 | 156,000 |
| 21 | 62,000 | | |

As can be seen from the above tables, the use of the adsorbent in the purification of the diluent led to the production of a product which was uniformly of higher molecular weight than the product obtained when the adsorbing step was omitted. In order to determine exactly what was removed by the charcoal, the charcoal tower containing 354 cu. inches of charcoal, which was used in the production of approximately 320 lb. of high molecular weight polymer, was steamed, and yielded 170 cc. of water insoluble material having a specific gravity of 0.7212, and having the following boiling range:

| Initial B. P. | 103° C. | |
| --- | --- | --- |
| | 105° C. | 7.0% |
| | 110° C. | 9.0% |
| | 120° C. | 25.0 |
| | 125° C. | 43.0 |
| | 130° C. | 61.5 |
| | 140° C. | 86.0% |
| | 150° C. | 88.0 |
| | 160° C. | 93.0 |
| Recovery | | 96.0% |
| Loss | | 3.0% |
| F. B. P. | | 167.8° C. |

These characteristics indicate that the normally liquid impurities removed from the circulated diluent were composed of dimer and trimer of isobutylene. It follows that it was the introduction of these substances into the reaction chamber which caused the previous difficulty in consistently obtaining polymers of the desired molecular weight.

In order to definitely establish the correctness of the conclusion indicated by the above experiments, a number of runs were made in which diisobutylene was purposely added to the feed stock. In operating under conditions suitable for the production of a polymer having a molecular weight of 31,000, the addition of .5% of diisobutylene to the feed reduced the molecular weight of the polymer produced to 26,000, 1% of diisobutylene reduced the molecular weight of the polymer to about 16,500 and 2% of diisobutylene reduced the molecular weight of the polymer to 11,000.

It is apparent from the above description that the essence of the present invention is the inclusion in the purification of a circulated diluent employed in the process of producing polymers of high molecular weight from isobutylene of a treatment for the removal of low molecular weight polymers. While this treatment has been described in the foregoing as an adsorption, it is apparent that it can be a controlled chilling to a point above the liquefaction point of the diluent but considerably below the boiling point of the low molecular weight polymers, preferably followed by passage of the diluent through any absorption medium, such as asbestos or the like. In addition, this removal may be accomplished by scrubbing the gases with a liquid saturated hydrocarbon, such as butane, pentane, etc.

It is immaterial to the scope of the present invention whether or not the diluent is also employed as the refrigerating medium. It is likewise unimportant insofar as the present invention is concerned, what other purification steps are included in the treatment of the circulated diluent. Changes in these respects and other changes apparent to those skilled in the art are contemplated by the present invention, the scope of which is defined by the following claims in which it is intended to claim the present invention as broadly as the prior art will permit.

I claim:

1. In the production of a high molecular weight polymer of isobutylene by polymerizing isobutylene by the action of boron fluoride in the presence of an inert volatile diluent and low polymers of the type of dimer and trimer, separating the diluent from the high molecular weight polymer and recycling the diluent to the reaction chamber, the step of removing the recycled diluent the low molecular weight polymers of isobutylene prior to its reintroduction into the reaction chamber.

2. In the production of a high molecular weight polymer of isobutylene by polymerizing isobutylene by the action of boron fluoride in the presence of an inert diluent, separating the diluent from the polymer, subjecting the diluent to a purifying treatment including a scrubbing with sulphuric acid and recycling the diluent to the reaction chamber, the step of subjecting the diluent subsequent to its treatment with sulphuric acid to a treatment suitable for the removal therefrom of low molecular weight polymers of isobutylene prior to its reintroduction into the reaction chamber.

3. A process according to claim 1, in which the removal of low molecular weight polymers from the diluent is effected by contacting the diluent with an adsorbent material.

4. In the production of a high molecular weight polymer of isobutylene by polymerizing isobutylene by the action of boron fluoride in the presence of an inert diluent, separating the diluent from the polymer and recycling the diluent to the reaction chamber, step of contacting the diluent with a solid adsorbent material prior to its reintroduction into the reaction chamber.

5. A process according to the preceding claim in which the solid adsorbent material is adsorbent carbon.

6. A process according to claim 2, in which the removal of low molecular weight polymers from the diluent gas is effected by contacting said gas with a solid adsorbent material.

7. The process of producing a high molecular weight polymer of isobutylene comprising the steps of mixing isobutylene, boron fluoride and an inert diluent, polymerizing the mixture at a low temperature, separating the diluent, separating boron fluoride from the diluent, removing from the diluent partially polymerized isobutylene and remixing the diluent with boron fluoride and isobutylene for further polymerization at low temperature.

8. The process of producing a high molecular weight polymer of isobutylene, comprising the steps of polymerizing the isobutylene by the action of boron fluoride in the presence of an inert hydrocarbon more volatile than isobutylene, separating the diluent and volatile materials from the polymer, washing the diluent and volatile products with water, scrubbing with sulfuric acid, thereafter removing partially polymerized isobutylene from the diluent and returning same to the reaction zone with further isobutylene and boron fluoride.

9. In a process for polymerization of isobutylene to high molecular weight in presence of a volatile inert diluent, the steps of removing partially polymerized isobutylene from the diluent and thereafter recycling the diluent for further polymerization use.

10. The process of producing high molecular weight polymers of isobutylene, comprising the steps of mixing isobutylene with boron fluoride in the presence of a volatile hydrocarbon refrigerant-diluent, polymerizing the isobutylene in the presence of the refrigerant-diluent vaporizing the diluent along with more volatile materials and separating it from the polymer, washing the vaporized diluent with water and with acid, reducing the amount of polymerized isobutylene to mere traces and then mixing the refrigerant-diluent with further quantities of isobutylene and boron fluoride and polymerizing the further quantities of isobutylene in the presence of the washed diluent.

LEWIS A. BANNON.

CERTIFICATE OF CORRECTION.

Patent No. 2,176,194.                                             October 17, 1939.

LEWIS A. BANNON.

It is hereby certified that error appears in the above numbered patent requiring correction as follows: In the grant, line 14, name of assignee, for "Standard Oil Develoment Company" read Standard Oil Development Company, as shown by the record of assignments in this office; page 2, second column, lines 45 and 46, claim 1, strike out the words "and low polymers of the type of dimer and trimer" and insert the same after "diluent" in line 47, same claim; line 49, same claim 1, after "removing" insert from; and that the said Letters Patent should be read with this correction therein that the same may conform to the record of the case in the Patent Office.

Signed and sealed this 2nd day of January, A. D. 1940.

(Seal)                                                              Henry Van Arsdale,
Acting Commissioner of Patents.

diluent with a solid adsorbent material prior to its reintroduction into the reaction chamber.

5. A process according to the preceding claim in which the solid adsorbent material is adsorbent carbon.

6. A process according to claim 2, in which the removal of low molecular weight polymers from the diluent gas is effected by contacting said gas with a solid adsorbent material.

7. The process of producing a high molecular weight polymer of isobutylene comprising the steps of mixing isobutylene, boron fluoride and an inert diluent, polymerizing the mixture at a low temperature, separating the diluent, separating boron fluoride from the diluent, removing from the diluent partially polymerized isobutylene and remixing the diluent with boron fluoride and isobutylene for further polymerization at low temperature.

8. The process of producing a high molecular weight polymer of isobutylene, comprising the steps of polymerizing the isobutylene by the action of boron fluoride in the presence of an inert hydrocarbon more volatile than isobutylene, separating the diluent and volatile materials from the polymer, washing the diluent and volatile products with water, scrubbing with sulfuric acid, thereafter removing partially polymerized isobutylene from the diluent and returning same to the reaction zone with further isobutylene and boron fluoride.

9. In a process for polymerization of isobutylene to high molecular weight in presence of a volatile inert diluent, the steps of removing partially polymerized isobutylene from the diluent and thereafter recycling the diluent for further polymerization use.

10. The process of producing high molecular weight polymers of isobutylene, comprising the steps of mixing isobutylene with boron fluoride in the presence of a volatile hydrocarbon refrigerant-diluent, polymerizing the isobutylene in the presence of the refrigerant-diluent vaporizing the diluent along with more volatile materials and separating it from the polymer, washing the vaporized diluent with water and with acid, reducing the amount of polymerized isobutylene to mere traces and then mixing the refrigerant-diluent with further quantities of isobutylene and boron fluoride and polymerizing the further quantities of isobutylene in the presence of the washed diluent.

LEWIS A. BANNON.

CERTIFICATE OF CORRECTION.

Patent No. 2,176,194.                                     October 17, 1939.

LEWIS A. BANNON.

It is hereby certified that error appears in the above numbered patent requiring correction as follows: In the grant, line 14, name of assignee, for "Standard Oil Develoment Company" read Standard Oil Development Company, as shown by the record of assignments in this office; page 2, second column, lines 45 and 46, claim 1, strike out the words "and low polymers of the type of dimer and trimer" and insert the same after "diluent" in line 47, same claim; line 49, same claim 1, after "removing" insert from; and that the said Letters Patent should be read with this correction therein that the same may conform to the record of the case in the Patent Office.

Signed and sealed this 2nd day of January, A. D. 1940.

Henry Van Arsdale, (Seal)                                        Acting Commissioner of Patents.